US007724466B2

(12) United States Patent
Bui et al.

(10) Patent No.: US 7,724,466 B2
(45) Date of Patent: May 25, 2010

(54) METHOD AND SYSTEM FOR SERVO STRIPE WIDTH DETECTION AND COMPENSATION

(75) Inventors: Nhan X. Bui, Tucson, AZ (US); Edwin R. Childers, Tucson, AZ (US); Reed A. Hancock, Tucson, AZ (US); David H. Flores Harper, Vail, AZ (US); Kazuhiro Tsuruta, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 12/036,905

(22) Filed: Feb. 25, 2008

(65) Prior Publication Data

US 2009/0213489 A1 Aug. 27, 2009

(51) Int. Cl.
G11B 5/584 (2006.01)
(52) U.S. Cl. ...................... 360/77.12; 360/75
(58) Field of Classification Search ........... 360/77.12
See application file for complete search history.

(56) References Cited

U.S. PATENT DOCUMENTS

| 5,396,376 | A | | 3/1995 | Chambors et al. | |
|---|---|---|---|---|---|
| 6,031,673 | A | * | 2/2000 | Fasen et al. | 360/77.12 |
| 6,111,719 | A | * | 8/2000 | Fasen | 360/77.12 |
| 6,278,572 | B1 | * | 8/2001 | Kletzl et al. | 360/95 |
| 6,430,008 | B1 | | 8/2002 | Trabert et al. | |
| 6,462,904 | B1 | | 10/2002 | Albrecht et al. | |
| 6,762,900 | B2 | * | 7/2004 | Bui et al. | 360/77.12 |
| 6,903,895 | B2 | | 6/2005 | Chliwnyj et al. | |
| 6,934,108 | B2 | * | 8/2005 | Harper et al. | 360/71 |
| 6,937,425 | B2 | | 8/2005 | Knowles et al. | |
| 6,943,979 | B2 | * | 9/2005 | Goker et al. | 360/77.12 |
| 7,035,040 | B2 | | 4/2006 | Molstad et al. | |
| 7,333,291 | B1 | * | 2/2008 | Fasen | 360/77.12 |
| 7,403,350 | B2 | * | 7/2008 | Bates et al. | 360/77.12 |
| 7,411,759 | B2 | * | 8/2008 | Trabert et al. | 360/77.12 |
| 7,428,117 | B2 | * | 9/2008 | Nakao | 360/77.12 |
| 7,430,087 | B2 | * | 9/2008 | Bates et al. | 360/73.04 |

* cited by examiner

*Primary Examiner*—Mark Blouin
*Assistant Examiner*—James L Habermehl (57) ABSTRACT

A method and system for servo stripe width detection and compensation including moving a magnetic tape in a first direction across a magnetic tape head, the magnetic tape having a servo band including a first servo pattern and a second servo pattern, the magnetic tape head having a servo element; detecting a leading edge and a trailing edge of the first servo pattern with the servo element; detecting a leading edge and a trailing edge of the second servo pattern with the servo element; determining a first time from the leading edge of the first servo pattern to the leading edge of the second servo pattern; determining a second time from the trailing edge of the first servo pattern to the trailing edge of the second servo pattern; and determining a correction value from a difference between the first time and the second time.

20 Claims, 7 Drawing Sheets

METHOD AND SYSTEM FOR SERVO STRIPE WIDTH DETECTION AND COMPENSATION

FIELD OF THE INVENTION

This invention relates generally to recording and reading data from magnetic storage media and, more particularly, to a method and system for servo stripe width detection and compensation.

BACKGROUND

As the magnetic storage of information becomes more sophisticated, greater amounts of data are packed into smaller volumes of space. In storing large amounts of data on a magnetic tape, multiple tracks of data are stored paralleling the length of the tape. The number of tracks that can be stored on a particular width of tape depends on the sensitivity of the technology used. Currently it is possible to have several hundred tracks on a ½ inch wide magnetic tape. The accuracy of how well the read/write head can be properly positioned depends on several factors.

A major hurdle in recording and reading data from the hundreds of tracks on the magnetic tape is the lateral movement of the tape media as it traverses the read/write head. This is overcome by manufacturing the tape with recorded tracks of servo information at various lateral locations across the tape. These servo tracks provide information that allows the servo mechanisms in a tape transport to correctly position the magnetic tape head with respect to the data tracks.

One method of coding information in the patterns written in the servo tracks is timing based servo (TBS) coding which is insensitive to reading speed and provides a method of generating a tracking error signal to accurately position a read/write head on tape media. The TBS method provides that each servo track is written with a repeating cyclic sequence of patterned lines whose separation from each other varies in a consistent manner across the width of the servo track at the time of the magnetic tape manufacture. The periodic gaps are written at the time the cartridge is manufactured using a formatter head which writes a series of servo bands down the length of tape.

Servo bands written on the tape are monitored and followed to ensure that the drive's read/write heads are correctly placed on the tape. Repeatable vertical data track placement is essential to avoid errors that may occur when reading and writing data. A misplaced read/write head could read data from an adjacent track during a read operation or when writing data it is possible to overwrite existing data on an adjacent track. Correct data track placement assumes that the servo edges are a predetermined distance apart. The magnetic tapes are servo formatted to achieve such predetermined spacing. The servo readers on the magnetic tape head are also a predetermined distance apart. Variations in the servo bands may result in a data track placement error.

Tape drives often use the TBS format which determines the timing from edge to edge between two servo patterns, specifically an A and a B pattern. It is this edge to edge timing in conjunction with drive microcode that determines the position of the magnetic tape head on the tape. The A and B patterns are made up of individual stripes that include leading and trailing edges and are written by two separate servo format gaps. It is desirable to write the stripes of the same width, but due to head, coil, and electronic tolerances, the widths of these stripes can differ. This difference can introduce errors which will induce a positional offset of the magnetic tape head relative to the tape which can begin to encroach on adjacent tracks. If the stripe widths are significantly different, the read/write head can be positioned such that it can overwrite a portion of the adjacent track which can lead to data detection errors, data loss or the like.

The gain of the servo algorithms is such that even small difference in the stripe widths can cause a meaningful amount of track misregistration (TMR) in the tape tracks. As the track densities become higher, the track misregistration budgets become tighter and the TMR component becomes a larger percentage of the TMR budget.

It would be desirable to have a method and system for servo stripe width detection and compensation that would overcome the above disadvantages.

SUMMARY OF THE INVENTION

One aspect of the present invention provides a method for servo stripe width detection including moving a magnetic tape in a first direction across a magnetic tape head, the magnetic tape having a servo band including a first servo pattern and a second servo pattern, the magnetic tape head having a servo element; detecting a leading edge and a trailing edge of the first servo pattern with the servo element at a predetermined transverse point on the servo band; detecting a leading edge and a trailing edge of the second servo pattern with the servo element at the predetermined transverse point; determining a first time from the leading edge of the first servo pattern to the leading edge of the second servo pattern; determining a second time from the trailing edge of the first servo pattern to the trailing edge of the second servo pattern; and determining a correction value from a difference between the first time and the second time.

Another aspect of the present invention provides A system for positioning a magnetic tape head adjacent a moving magnetic tape having a servo band including a first servo pattern and a second servo pattern, the system including a tape drive for moving the magnetic tape across the magnetic tape head in a first direction; a servo element operably connected to the magnetic tape head for detecting a leading edge and a trailing edge of the first servo pattern, and for further detecting a leading edge and a trailing edge of the second servo pattern, the servo element being located at a predetermined transverse point on the servo band; a counter operably connected to the servo element for determining a first time from the leading edge of the first servo pattern to the leading edge of the second servo pattern, and for further determining a second time from the trailing edge of the first servo pattern to the trailing edge of the second servo pattern; and a control unit operably connected to the counter for determining a correction value from a difference between the first time and the second time.

Another aspect of the present invention provides a method for servo pattern compensation including moving a magnetic tape in a first direction across a magnetic tape head, the magnetic tape having a servo band including a first servo pattern having a leading edge and a trailing edge and a second servo pattern having a leading edge and a trailing edge, the magnetic tape head having a first servo element and a second servo element; detecting the leading edge of the first servo pattern with the first servo element at a predetermined transverse point on the servo band; detecting the leading edge of the second servo pattern with the first servo element at the predetermined transverse point; determining a first time between the detecting the leading edge of the first servo pattern with the first servo element and the detecting the leading edge of the second servo pattern with the first servo element; detecting the leading edge of the first servo pattern with the second servo element at the predetermined transverse point; detecting the leading edge of the second servo pattern with the second servo element at the predetermined transverse point; determining a second time between the detecting the leading edge of the first servo pattern with the second servo element and the detecting the leading edge of the second servo pattern with the second servo element; determining a first difference between the first time and the second time; detecting the trailing edge of the first servo pattern with the second servo element at the predetermined transverse point; detecting the trailing edge of the second servo pattern with the second servo element at the predetermined transverse point; determining a third time between the detecting the trailing edge of the first servo pattern with the second servo element and the detecting the trailing edge of the second servo pattern with the second servo element; determining a second difference between the first time and the third time; and determining a correction value from a third difference between the second difference and the first difference.

Another aspect of the present invention provides a system for positioning a magnetic tape head adjacent a moving magnetic tape having a servo band including a first servo pattern and a second servo pattern, the system including a tape drive for moving the magnetic tape across the magnetic tape head in a first direction; a first servo element operably connected to the magnetic tape head for detecting a leading edge of the first servo pattern, and for further detecting a leading edge of the second servo pattern, the servo element being located at a predetermined transverse point on the servo band; a second servo element operably connected to the magnetic tape head for detecting the leading edge and a trailing edge of the first servo pattern, and for further detecting the leading edge and a trailing edge of the second servo pattern, the servo element being located at the predetermined transverse point; a counter responsive to the first servo element for determining a first time between the leading edge of the first servo pattern to the leading edge of the second servo pattern, and further responsive to the second servo element for determining a second time from the leading edge of the first servo pattern to the leading edge of the second servo pattern, and further responsive to the second servo element for determining a third time from the trailing edge of the first servo pattern to the trailing edge of the second servo pattern; and a control unit operably connected to the counter for determining a first difference between the first time and the second time, and for further determining a second difference between the first time and the third time, and for further determining a correction value from a third difference between the second difference and the first difference.

The method and system for servo stripe width detection and compensation provides the capability to use leading edge and trailing edge servo band detection with the tape moving in the forward or reverse directions to compensate for servo stripe width differences and/or offset between the leading and the trailing edge of the servo pattern. Such capability enhances the servo tracking performance.

DETAILED DESCRIPTION

The method and system for servo stripe width detection and compensation of the present invention provides a means of detecting the left to right head module offset and the difference in widths between A and B servo stripes in a timing based servo (TBS) system. The method and system compensate for the head module offset and the difference in widths between the servo stripes.

Figure 1:
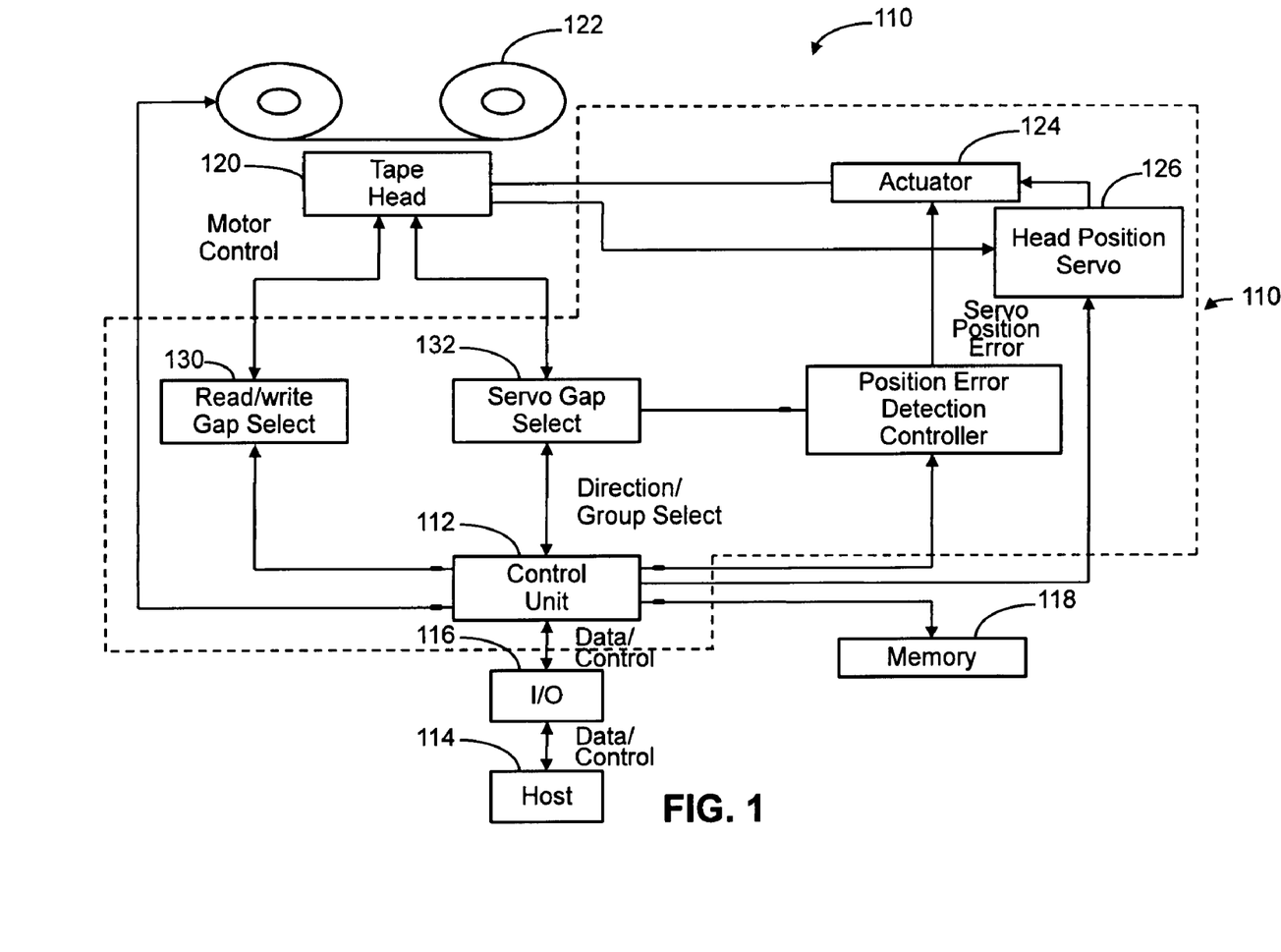
FIG. 1 is a block diagram of a tape storage system for use with the method of the present invention.

FIG. 1 is a block diagram of a tape storage system. The tape storage system 110 operates to read and write data to and from a magnetic tape 122 that contains servo information for transversely positioning a magnetic tape head 120. The magnetic tape head 120 can include read/write elements and servo elements within the magnetic tape head 120. In one embodiment, the magnetic tape head 120 includes a first head module and a second head module positioned adjacent to each other along the direction of magnetic tape travel, i.e., one head module to the left and one head module to the right such that a transverse segment of the magnetic tape first crosses one of the head modules and then crosses the other of the head modules. Each of the head modules can have one or more servo elements operable to read a servo band. In one embodiment, each of the head modules includes two servo elements positioned adjacent to each other perpendicular to the direction of magnetic tape travel, i.e., one servo element at the top of the head module top and one servo element on the bottom of the head module such that a transverse segment of the magnetic tape crosses both the top and bottom servo elements together.

Tape storage system 110 includes a control unit 112 that executes steps of microcode and exchanges data and control signals with a host 114 through an interface 116. The control unit 112 can be connected to a memory device 118, such as random access memory or the like, to store various data such as magnetic tape head calibration information, servo pattern timing values, track compensation values, and the like. The control unit 112 can also be connected to tape motors and tachometer (not shown) to control the direction, velocity, and acceleration of the magnetic tape 122 in operation and through microcode and similar tape control signals.

Tape storage system 110 can also include a drive servo control loop 123 which includes control unit 112, actuator 124, head position servo 126, position error controller 128, read/write gap select 130, and servo gap select 132. Position error controller 128 directs positioning actuator 124 during servo controlled track following. The actuator 124 can include a highly precise stepper motor or a voice coil motor. Position error controller 128 includes components for generating position error signals (PESs). In the example illustrated, two position error signals are generated simultaneously from signals provided by head modules located on magnetic tape head 120. Each of the position error signals provides a signal that is proportional to the position of each head module relative to each servo pattern edge. Read/write gap select 130 includes a counter (not shown) for determining the location of magnetic tape 122 with respect to magnetic tape head 120. Those skilled in the art will appreciate that two or more magnetic tape heads, head modules, and/or read elements can be used in a tape storage unit as desired for a particular application.

Tape storage system 110 also includes a number of positioning components. Actuator 124 directs movement of the magnetic tape head 120 in a transverse direction relative to the magnetic tape movement direction. Transverse positioning refers to movement of the magnetic tape head 120 across the width of the magnetic tape 122, generally perpendicular to the longitudinal movement of the magnetic tape 122. A tape drive (not shown) moves the magnetic tape 122 along its length across the magnetic tape head 120.

The control unit 112 provides a control unit output signal to a head position servo 126 and includes the circuitry to determine the relative distance of tape movement through a signal responsive to the counter of read/write gap select 130. Head position servo 126 is a control system that maintains magnetic tape head 120 at a controlled position relative to magnetic tape 122 through a set of microcode steps. The control unit 112 activates the head position servo 126 to transmit an appropriate signal to the actuator 124 when the magnetic tape head 120 is to be moved to a selected index position.

Figure 2:
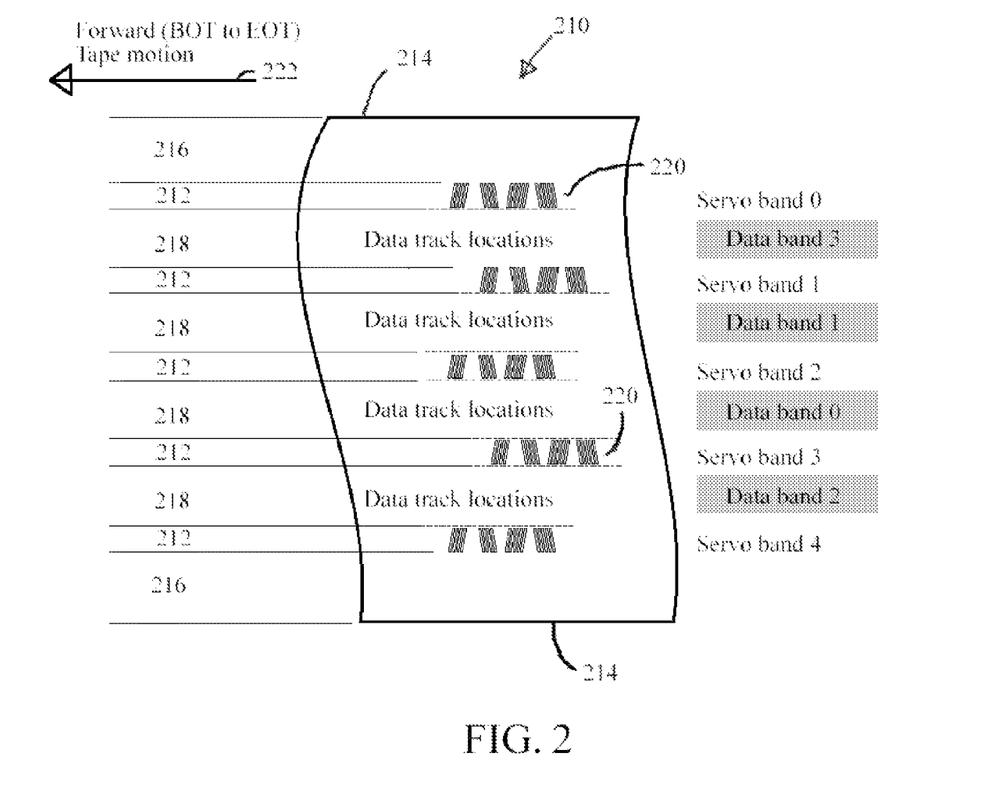
FIG. 2 is a detailed view of a magnetic tape segment including a servo band for use with the method of the present invention.

FIG. 2 is a detailed view of a magnetic tape segment including a servo band. As described above, a system utilizing the timing based servo (TBS) method generates position error signals to accurately position a read/write head on magnetic tape, such as magnetic tape within a tape cartridge. Magnetic Tape 210 includes tape reference edges 214, edge guard bands 216, data bands 218, and servo bands 212. Formatted servo patterns 220 are written on the servo bands 220 at the time of the tape manufacture at the media supplier. A formatter head (not shown) writes the formatted servo patterns 212 along the length of the magnetic tape 210. The magnetic tape 210 can move forwards or backwards. As defined herein, motion in the forward direction is from the beginning of tape (BOT) to end of tape (EOT) as shown by arrow 222 and the motion in the backwards direction opposite to the forward direction is from the to end of tape (EOT) to the beginning of tape (BOT). Those skilled in the art will appreciate that the defined directions of forward and backward are arbitrary and can be reversed as long as they are used consistently for a single application.

Figure 3:
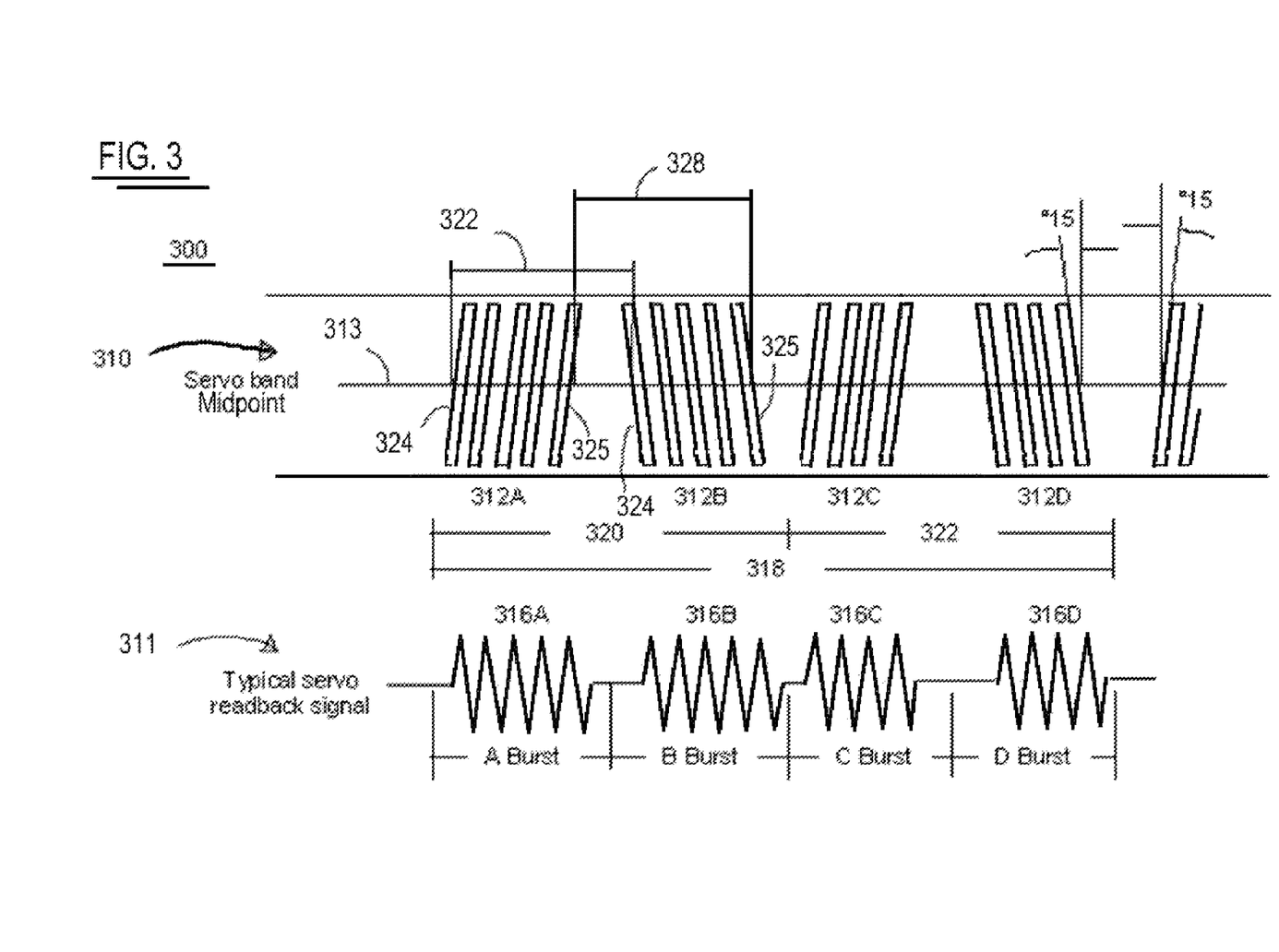
FIG. 3 is a detailed view of a servo band for use with a method of the present invention.

FIG. 3 is a detailed view of a servo band. Magnetic tape 300 including formatted servo patterns 312A, 312B, 312C and 312D in servo band 310 can be installed in a cartridge. A read/write drive can use a head module to read magnetic tape 300 as it traverses the servo band 310. In this example, the servo band 310 includes A servo patterns 312A and 312C angled to the right, and B servo patterns 312B and 312D angled to the left. Each servo pattern 312 is made up of individual servo stripes 314. Those skilled in the art will appreciate that the servo pattern 312 can include one or more servo stripes, in any pattern desired for particular application, with or without an angle to the transverse direction of the magnetic tape 300.

A position error signal (PES) can be derived by counting the time to traverse the various stripes 314 in the servo patterns 312A-D. The edges of each servo stripe can be used to trigger a counter and create a servo readback signal 311 as illustrated by bursts 316A, 316B, 316C, and 316D, corresponding to servo patterns 312A-D. In this example, servo patterns 312A-D together make up a servo frame 318 and each pair of two servo patterns (i.e., A and B, C and D) of servo frame 318 creates servo sub frames 320 and 322, respectively.

The time, measured in counts, to traverse from the leading edge 324 of the first stripe in servo pattern 312A to the leading edge 324 of the first stripe of servo pattern 312B is an A count indicative of the time to traverse A distance 322. The time to traverse from the trailing edge 325 of the last stripe in servo pattern 312A to the trailing edge 327 of the last stripe in servo pattern 312B is the B count indicative of the time to traverse B distance 328. The A distance 322 and the B distance 328 are longer or shorter, and thus the A count and B count longer or shorter, depending on where the magnetic tape head is positioned in vertical locations transverse to the direction of motion on the magnetic tape 300 along the servo band 320. In the example illustrated, the servo element is following the midpoint 313 of the servo band 310 to measure the A count and B count.

The magnetic tape head can be positioned consistently at a transverse location on the magnetic tape 300 for reading the magnetic tape 300 to maintain measurement consistency and to avoid positional errors. In one example, the A count can be used to determine the transverse position of the magnetic tape head 120 relative to the servo patterns 312. The microcode has a set A count for each data track that the drive microcode uses as the reference position. Accordingly, a position error signal can be developed for each servo pattern by subtracting the actual A count from the set A count. Such position error signals are then used in the drive servo control loop 123 (FIG. 1) to position the head/actuator system at the required vertical position on the magnetic tape 300. Such controlled positioning maintains accurate placement and location of the magnetic tape head 120 relative to the desired writing or reading a data track on magnetic tape 300 (FIGS. 1 & 2). Those skilled in the art will appreciate that various combinations of the distances between servo stripes 314 and/or different edges of the servo stripes 314 can be used to determine the vertical position of the magnetic tape head on the magnetic tape 300, and to use the determined vertical position to calculate a position error signal, as desired for a particular application.

Figure 4A:
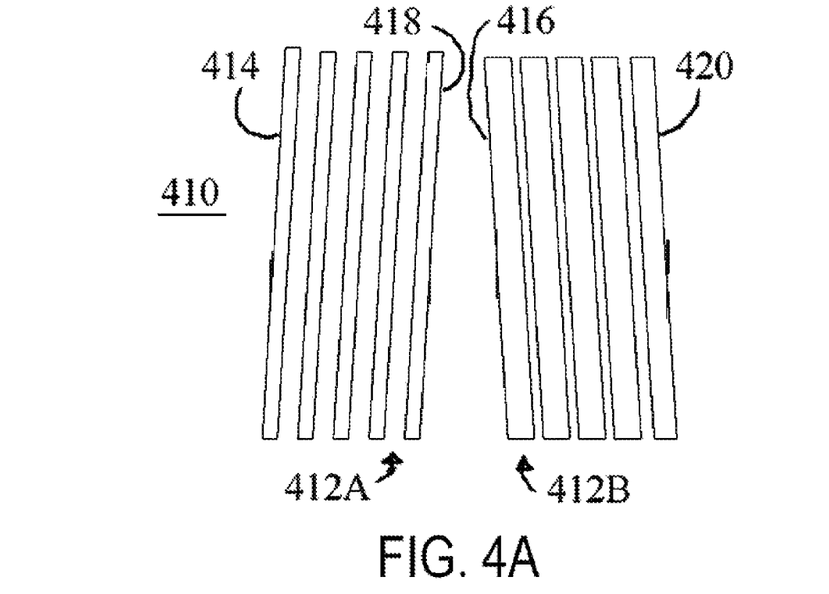
FIG. 4A is a detailed view of a servo frame for use with a method of the present invention.

FIG. 4A is a detailed view of a servo frame. The accuracy of positioning the magnetic tape head by the actuator depends on several factors, including any unintentional difference that may exist between the widths of the servo stripes. In this example, servo band 410 includes servo patterns 412A and 412B with servo stripes of unequal width. The same servo patterns 412 can be used when the magnetic tape moves either in the forward direction (right to left) or the backward direction (left to right). Accordingly, the leading edges 414, 416 of the servo patterns 412A, 412B in the backward direction are the trailing edges 418, 420 in the forward direction. The drive electronics and microcode allow the detection and use of either the leading or trailing edges in either direction. This is desirable to compensate for defects in the servo patterns 412A, 412B that may exist on the magnetic tape.

Figure 4B:
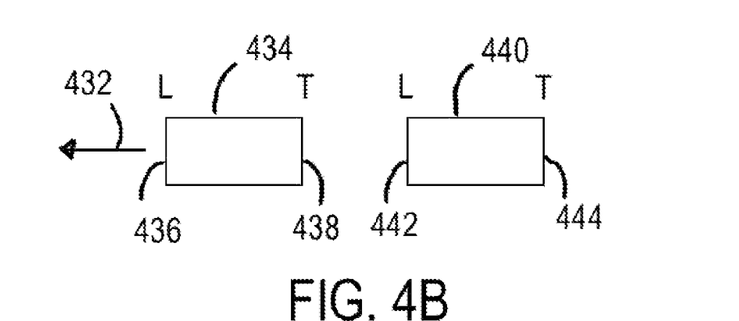
FIGS. 4B & 4C are schematic views of a servo frame for use with a method of the present invention.
Figure 4C:
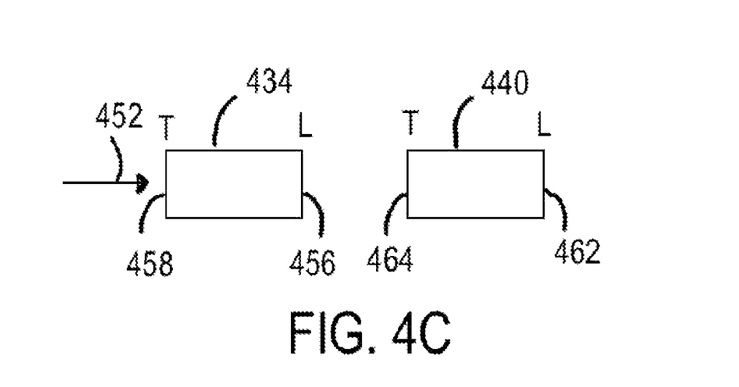

FIGS. 4B & 4C are schematic views of a servo frame. Each servo pattern is illustrated as a single servo stripe with no angle for clarity of illustration. In FIG. 4B, the servo frame 430 on the magnetic tape is moving in the forward direction relative to the magnetic tape head as shown by the arrow 432. In the forward direction, servo pattern 434 has a leading edge 436 and a trailing edge 438, and servo pattern 440 has a leading edge 442 and a trailing edge 444. In FIG. 4C, the servo frame 430 on the magnetic tape is moving in the reverse direction relative to the magnetic tape head as shown by the arrow 452, i.e., the servo frame 430 is moving in a direction opposite the forward direction. In the reverse direction, servo pattern 434 has a leading edge 456 and a trailing edge 458, and servo pattern 440 has a leading edge 462 and a trailing edge 464. The leading and trailing edges switch positions between the forward and reverse directions: the leading edge 436 and trailing edge 438 become the reverse trailing edge 458 and the reverse leading edge 456, respectively, and the leading edge 442 and trailing edge 444 become the reverse trailing edge 464 and reverse leading edge 462, respectively. Those skilled in the art will appreciate that the designations of directions can be reversed as desired for a particular application.

Figure 5:
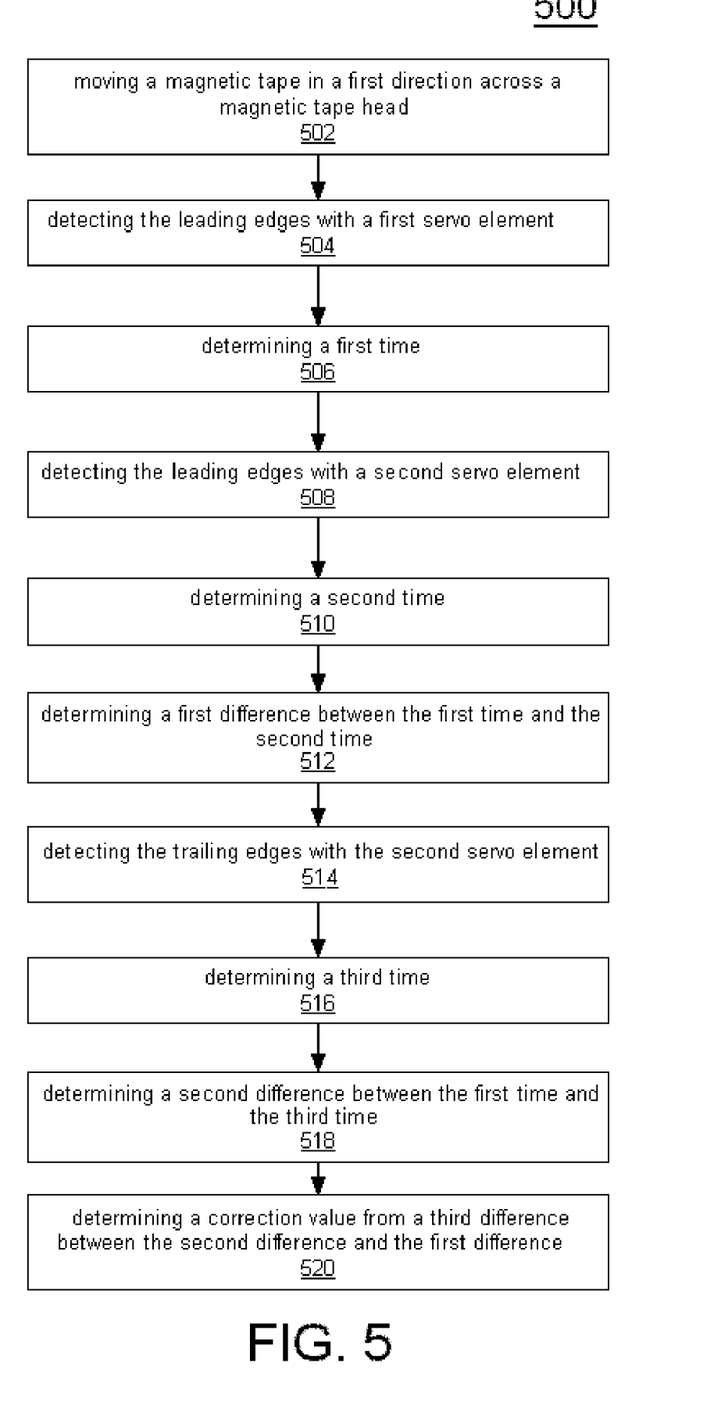
FIG. 5 is a flowchart of one method for servo pattern compensation in accordance with the present invention.

FIG. 5 is a flowchart of one method for servo pattern compensation in accordance with the present invention. The method 500 includes moving a magnetic tape in a first direction across a magnetic tape head 502, the magnetic tape having a servo band including a first servo pattern having a leading edge and a trailing edge and a second servo pattern having a leading edge and a trailing edge, the magnetic tape head having a first servo element and a second servo element. The method 500 further includes detecting the leading edges with the first servo element 504, i.e., detecting the leading edge of the first servo pattern and detecting the leading edge of the second servo pattern with the first servo element at a predetermined transverse point on the servo band; determining a first time 506 between the detecting the leading edge of the first servo pattern and the detecting the leading edge of the second servo pattern with the first servo element; detecting the leading edges with the second servo element 508, i.e., detecting the leading edge of the first servo pattern and detecting the leading edge of the second servo pattern with a second servo element at the predetermined transverse point; determining a second time 510 between the detecting the leading edge of the first servo pattern and the detecting the leading edge of the second servo pattern with the second servo element; determining a first difference between the first time and the second time 512; detecting the trailing edges with the second servo element 514, i.e., detecting the trailing edge of the first servo pattern and detecting the trailing edge of the second servo pattern with the second servo element at the predetermined transverse point; determining a third time 516 between the detecting the trailing edge of the first servo pattern and the detecting the trailing edge of the second servo pattern with the second servo element; determining a second difference between the first time and the third time 518; determining a correction value from a third difference between the second difference and the first difference 520. The method 500 can further include determining a correction signal in response to the correction value, the correction signal being proportional to the correction value, and positioning a head module of the magnetic tape head in response to the correction signal.

The method 500 provides for the track misregistration (TMR) detection within the same time pattern. Specifically, the detection and calculation both occur within the same servo frame 318 of one set of servo patterns 312A, 312B, 312C, and 312D as shown in FIG. 3. The method 500 takes into consideration that magnetic tape head 120 (FIG. 1) may be skewed from its intended position, and detects and compensates for the magnetic tape head being out of alignment and/or offset. As defined herein, the term correction value can be used to describe the signals generated within the circuitry and/or within the microcode to control the magnetic tape heads used with magnetic tape and servo patterns in a tape drive.

The method 500 can further include determining a compensated time as required to compensate for difference in width between the first servo pattern and the second servo pattern, as well as skew and offset, depending on the direction of magnetic tape motion. In one embodiment, the method 500 can further include moving the magnetic tape in the first direction across the magnetic tape head; determining a third time between the trailing edge of the first servo pattern and the trailing edge of the second servo pattern; and determining a compensated time by adding the correction value to the third time. In another embodiment, the method 500 can further include moving the magnetic tape in a direction opposite the first direction across the magnetic tape head; determining a third time between a reverse leading edge of the first servo pattern and a reverse leading edge of the second servo pattern; and determining a compensated time by adding the correction value to the third time. In yet another embodiment, the method 500 can further include moving the magnetic tape in the first direction across the magnetic tape head; determining a third time between the leading edge of the first servo pattern and the leading edge of the second servo pattern; and designating a compensated time as the third time. In this case, no compensation is required for a difference in width between the first servo pattern and the second servo pattern. In yet another embodiment, the method 500 can further include moving the magnetic tape in a direction opposite the first direction across the magnetic tape head; determining a third time between a reverse trailing edge of the first servo pattern and a reverse trailing edge of the second servo pattern; designating a compensated time as the third time. In this case, no compensation is required for a difference in width between the first servo pattern and the second servo pattern.

Referring to FIG. 5, moving a magnetic tape in a first direction across a magnetic tape head 502 can include placing the drive in track following mode using the top or bottom servo elements of the left servo module. The servo pattern detection circuitry is set to detect the leading edge of the servo pattern. The drive is further placed in servo mode, so that the top or bottom servo elements of the left servo module and the right servo module remain side to side. In this mode, both of the top two servo elements or the bottom two servo elements are enabled for detecting the servo pattern. The servo pattern detection circuitry for the right servo element is set to detect the trailing edge of the servo pattern.

Detecting the leading edges with the first servo element 504, i.e., detecting the leading edge of the first servo pattern and detecting the leading edge of the second servo pattern with the first servo element at a predetermined transverse point on the servo band can include performing the detection with the left servo element at a lateral predetermined transverse point on the servo band, such as the midpoint or other predetermined transverse point, as desired for a particular application.

Determining a first time 506 between the detecting the leading edge of the first servo pattern and the detecting the leading edge of the second servo pattern with the first servo element can include determining the first time from the counts between detecting the leading edges of the first and second pattern stripes with the first servo element (a first A count).

Detecting the leading edges with the second servo element 508, i.e., detecting the leading edge of the first servo pattern and detecting the leading edge of the second servo pattern with a second servo element at the predetermined transverse point, can include detecting the leading edges with the right servo element at the same predetermined transverse point with the drive remaining in track following mode.

Determining a second time 510 between the detecting the leading edge of the first servo pattern and the detecting the leading edge of the second servo pattern with the second servo element can include determining the second time from the counts between detecting the leading edges of the first and second pattern stripes with the second servo element (a second A count).

Determining a first difference between the first time and the second time 512 determines the relative offset between the left and right head modules, which is needed to accurately determine the difference in stripe width (DIF-A).

Detecting the trailing edges with the second servo element 514, i.e., detecting the trailing edge of the first servo pattern and detecting the trailing edge of the second servo pattern with the second servo element at the predetermined transverse point can include detecting the trailing edges with the right servo element at the same predetermined transverse point with the drive remaining in track following mode.

Determining a third time 516 between the detecting the trailing edge of the first servo pattern and the detecting the trailing edge of the second servo pattern with the second servo element can include determining the third time from the counts between detecting the trailing edges of the first and second pattern stripes with the second servo element (a B count).

Determining a second difference between the first time and the third time 518 determines the second difference (DIF-B), then determining a correction value from a third difference (DIF-C) between the second difference and the first difference 520 determines the correction value, which is the third difference. The third difference indicates the relative width of the first pattern stripe and the second pattern stripe.

The correction value can be used to generate a correction signal, which can be used to adjust the position of at least one of left and right head modules for accurately reading the servo pattern. The correction signal can correct an electrical signal and/or software values that control position adjustment for correcting track misregistration (TMR). In one embodiment, the head module is adjusted in response to the correction signal through the microcode. When the leading edge to leading edge measurement is being used and the tape is moving forward, the DIF-C value can be ignored as no TMR compensation is necessary. When the trailing edge to trailing edge measurement is being used, and the tape is moving forward, the third difference DIF-C can be added to the first A count to compensate for the TMR. When the leading edge to leading edge measurement is being used and the tape is moving backwards, i.e., reverse leading edge to reverse leading edge, the third difference DIF-C can be added to the first A count to compensate for the TMR. When the trailing edge to trailing edge measurement is being used and the tape is moving backwards, i.e., reverse trailing edge to reverse trailing edge, the third difference DIF-C value can be ignored as no TMR compensation is necessary.

In one numerical example, detecting the leading edges with a first servo element 504 and determining a first time 506 generates a first time (a first A count) of 32768 counts between the leading edges. Detecting the leading edges with a second servo element 508 and determining a second time 510 generates a second time (a second A count) of 32780 counts between the leading edges. Determining a first difference between the first time and the second time 512 results in a first difference (DIF-A) of −12 counts, indicative of the relative offset between the left and right head modules (32768 counts minus 32780 counts). Detecting the trailing edges with the second servo element 514 and determining a third time 516 generates a third time (a B count) of 32801 counts between the trailing edges. Determining a second difference between the first time and the third time 518 results in a second difference (DIF-B) of −33 counts (32768 counts minus 32801 counts). Determining a third difference between the first difference and the second difference 520 generates a third difference (DIF-C) of −21 counts, which is the correction value indicative of the relative width of the first pattern stripe and the second pattern stripe (−33 counts minus −12 counts). When the third difference (DIF-C) is positive, the A stripe is wider than the B stripe. When the third difference (DIF-C) is negative, the A stripe is narrower than the B stripe.

Figure 6:
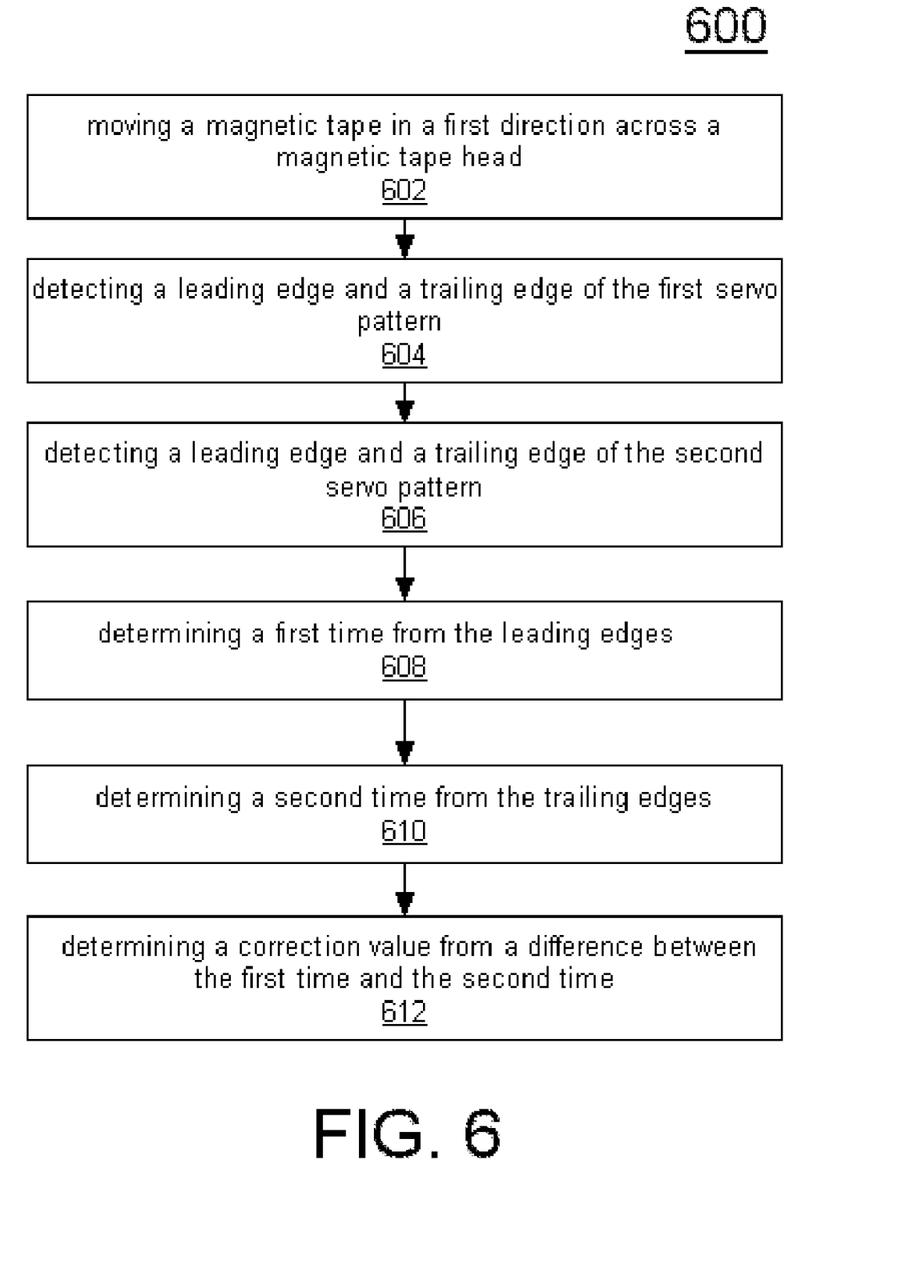
FIG. 6 is a flowchart of method for servo pattern compensation in accordance with the present invention.

FIG. 6 is a flowchart for another method for servo pattern compensation in accordance with the present invention. The method 600 includes moving a magnetic tape in a first direction across a magnetic tape head 602, the magnetic tape having a servo band including a first servo pattern and a second servo pattern, the magnetic tape head having a servo element; detecting a leading edge and a trailing edge of the first servo pattern 604 with the servo element at a predetermined transverse point on the servo band; detecting a leading edge and a trailing edge of the second servo pattern 606 with the servo element at the predetermined transverse point; determining a first time from the leading edges 608, i.e., determining a first time from the leading edge of the first servo pattern to the leading edge of the second servo pattern; determining a second time from the trailing edges 610, i.e., determining a second time from the trailing edge of the first servo pattern to the trailing edge of the second servo pattern; and determining a correction value from a difference between the first time and the second time 612. The method 500 can further include determining a correction signal in response to the correction value, the correction signal being proportional to the correction value, and positioning a head module of the magnetic tape head in response to the correction signal.

The method 600 provides track misregistration (TMR) detection within one servo frame of servo pattern A and B (FIG. 4) using a single servo head element. In the method 600, the magnetic tape head 120 (FIG. 1) is not skewed or any head skew is negligible, so only one servo element is needed for measurement.

The method 600 can further include determining a compensated time as required to compensate for difference in width between the first servo pattern and the second servo pattern, depending on the direction of magnetic tape motion. In one embodiment, the method 600 can further include moving the magnetic tape in the first direction across the magnetic tape head; determining a third time between the trailing edge of the first servo pattern and the trailing edge of the second servo pattern; and determining a compensated time by adding the correction value to the third time. In another embodiment, the method 600 can further include moving the magnetic tape in a direction opposite the first direction across the magnetic tape head; determining a third time between a reverse leading edge of the first servo pattern and a reverse leading edge of the second servo pattern; and determining a compensated time by adding the correction value to the third time. In yet another embodiment, the method 600 can further include moving the magnetic tape in the first direction across the magnetic tape head; determining a third time between the leading edge of the first servo pattern and the leading edge of the second servo pattern; and designating a compensated time as the third time. In this case, no compensation is required for a difference in width between the first servo pattern and the second servo pattern. In yet another embodiment, the method 600 can further include moving the magnetic tape in a direction opposite the first direction across the magnetic tape head; determining a third time between a reverse trailing edge of the first servo pattern and a reverse trailing edge of the second servo pattern; designating a compensated time as the third time. In this case, no compensation is required for a difference in width between the first servo pattern and the second servo pattern.

Referring to FIG. 6, detecting a leading edge and a trailing edge of the first servo pattern 604 with the servo element at a predetermined transverse point on the servo band can include performing the detection with the left or right servo element at a lateral predetermined transverse point on the servo band, such as the midpoint or other predetermined transverse point, as desired for a particular application.

Detecting a leading edge and a trailing edge of the second servo pattern 606 with the servo element at the predetermined transverse point can include performing the detection with the left or right servo element used in detecting the leading edge and trailing edge of the first servo pattern 604 at the lateral predetermined transverse point on the servo band, such as the midpoint or other predetermined transverse point, as desired for a particular application.

Determining a first time from the leading edges 608, i.e., determining a first time from the leading edge of the first servo pattern to the leading edge of the second servo pattern can include determining the first time from the counts between detecting the leading edges of the first and second servo patterns.

Determining a second time from the trailing edges 610, i.e., determining a second time from the trailing edge of the first servo pattern to the trailing edge of the second servo pattern can include determining the second time from the counts between detecting the trailing edges of the first and second servo patterns.

Determining a correction value from a difference between the first time and the second time 612 generates a correction value that can be used to account for track misregistration.

The correction value can be used to generate a correction signal, which can be used to adjust the position of at least one of left and right head modules for accurately reading the servo pattern. The correction signal can correct an electrical signal and/or software values that control position adjustment for correcting track misregistration (TMR). In one embodiment, the head module is adjusted in response to the correction signal through the microcode. When the leading edge of the first servo pattern to leading edge of the second servo pattern measurement is used and the tape is moving forward, the third difference DIF-C value can be ignored, as no TMR compensation is necessary. When the trailing edge of the first servo pattern to trailing edge of the second servo pattern measurement is being used, and the tape is moving forward, the third difference DIF-C can be added to first A count to compensate for the TMR. When the leading edge of the first servo pattern to leading edge of the second servo pattern measurement is being used and the tape is moving backwards, i.e., reverse leading edge to reverse leading edge, the third difference DIF-C can be added to first A count to compensate for the TMR. When the trailing edge of the first servo pattern to trailing edge of the second servo pattern measurement is being used and the tape is moving backwards, i.e., reverse trailing edge to reverse trailing edge, the third difference DIF-C value can be ignored, as no TMR compensation is necessary.

In one numerical example, detecting a leading edge and a trailing edge of the first servo pattern 604 and detecting a leading edge and a trailing edge of the second servo pattern 606, then determining a first time from the leading edges 608 generates a first time of 32768 counts between the leading edges. Detecting a leading edge and a trailing edge of the first servo pattern 604 and detecting a leading edge and a trailing edge of the second servo pattern 606, then determining a second time from the trailing edges 610 generates a second time of 32789 counts between the trailing edges. Determining a correction value from a difference between the first time and the second time 612 results in a correction value (DIF-C) of −21 counts indicative of the relative width of the first servo pattern and the second servo pattern (32768 counts minus 32789 counts). When the third difference (DIF-C) is positive, the A stripe is wider than the B stripe. When the third difference (DIF-C) is negative, the A stripe is narrower than the B stripe.

Figures 7A, 7B:
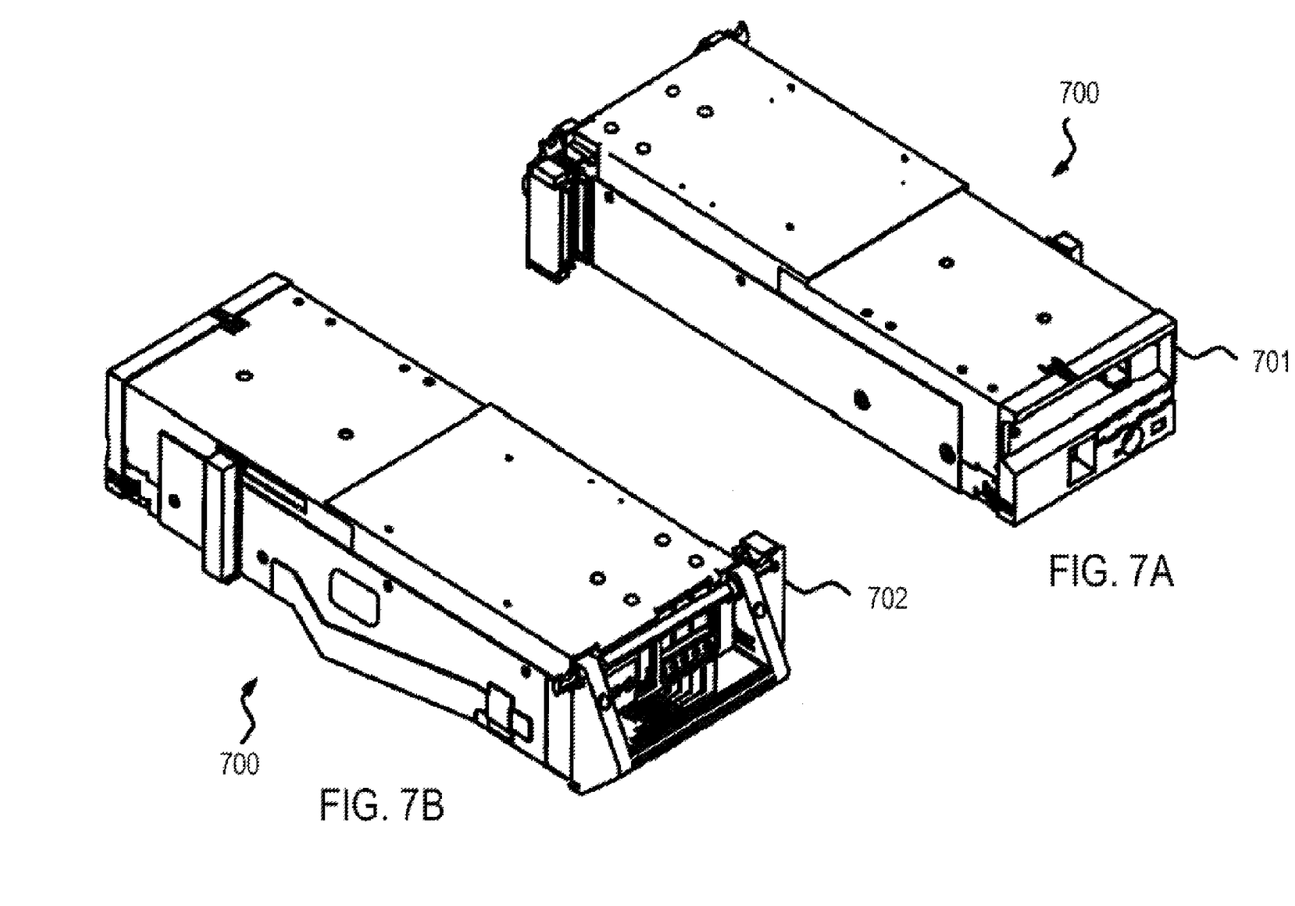
FIGS. 7A & 7B are a front view and rear view, respectively, of a tape drive in accordance with the present invention.

FIGS. 7A & 7B are a front view and rear view, respectively, of a tape drive including a magnetic tape employing a servo stripe width detection and compensation method and system according to the present invention. FIG. 7A illustrates a tape drive 700 having a front 701. FIG. 7B illustrates tape drive 700 having a rear 702. The tape drive 700 includes the servo stripe width detection and compensation system and practices the servo stripe width detection and compensation methods of the present invention.

It is to be understood that several of the steps disclosed in the flow charts of FIGS. 5 & 6 and the specific components of the circuits illustrated in FIG. 1 could be performed by software programmed to carry out method steps shown in FIGS. 5 & 6. These steps could be performed, by way of example only, through software or a program storage device which may be part of a digital computer or a magnetic storage drive. In accordance with the present invention, the program or storage device may be implemented by a processor within a computer that executes a series of computer-executable instructions. These instructions may reside, for example, in RAM, ROM or other storage media of the computer. Alternatively, the instructions may be contained on a data storage medium, such as a computer CD, DVD, ROM, RAM or diskette. Furthermore, the instructions may be stored on a DASD array, magnetic tape, conventional hard disk drive, electronic read-only memory, optical storage device, or other appropriate data storage device. In such an alternate embodiment, the computer-executable instructions may be lines of compiled executable code or microcode as available in any computer executable code, steps or language.

It should be further understood that the magnetic tape head contemplated herein may consist of multiple elements for reading specific portions of the magnetic tape. Such elements may include servo read elements, data read elements and data write elements positioned at various locations on or proximate the magnetic tape head. No limitation on the configuration of the magnetic tape head and its multiple elements shall be inferred by the disclosure herein.

While the present invention has been described above in terms of specific embodiments, it is to be understood that the invention is not intended to be confined or limited to the preferred embodiments disclosed herein and that the scope of the present invention fully encompasses other embodiments which may become obvious to those skilled in the art. In addition, while specific component values have been show for ease of illustration and description, it should be understood that a variety of combination of values is possible and contemplated by the present invention. Further, while specific connections have been used and shown for ease of description, it should also be understood that a variety of connection points are possible and may vary depending on the specifics of the application and circuit used. These and all other such modifications and changes are considered to be within the scope of the appended claims and that the scope of the present invention is accordingly to be limited by nothing other than the appended claims.

We claim:

1. A method for servo stripe width detection comprising:
    moving a magnetic tape in a first direction across a magnetic tape head, the magnetic tape having a servo band including a first servo pattern and a second servo pattern, the magnetic tape head having a servo element;

detecting a leading edge and a trailing edge of the first servo pattern with the servo element at a predetermined transverse point on the servo band;

detecting a leading edge and a trailing edge of the second servo pattern with the servo element at the predetermined transverse point;

determining a first time from the leading edge of the first servo pattern to the leading edge of the second servo pattern;

determining a second time from the trailing edge of the first servo pattern to the trailing edge of the second servo pattern; and determining a correction value from a difference between the first time and the second time.

2. The method of claim 1 further comprising determining a correction signal in response to the correction value, the correction signal being proportional to the correction value.

3. The method of claim 2 further comprising positioning a head module of the magnetic tape head in response to the correction signal.

4. The method of claim 1 further comprising:

moving the magnetic tape in the first direction across the magnetic tape head;

determining a third time between the trailing edge of the first servo pattern and the trailing edge of the second servo pattern; and determining a compensated time by adding the correction value to the third time.

5. The method of claim 1 further comprising:

moving the magnetic tape in a direction opposite the first direction across the magnetic tape head;

determining a third time between a reverse leading edge of the first servo pattern and a reverse leading edge of the second servo pattern; and determining a compensated time by adding the correction value to the third time.

6. The method of claim 1 further comprising:

moving the magnetic tape in the first direction across the magnetic tape head;

determining a third time between the leading edge of the first servo pattern and the leading edge of the second servo pattern; and designating a compensated time as the third time.

7. The method of claim 1 further comprising:

moving the magnetic tape in a direction opposite the first direction across the magnetic tape head;

determining a third time between a reverse trailing edge of the first servo pattern and a reverse trailing edge of the second servo pattern;

designating a compensated time as the third time.

8. A system for positioning a magnetic tape head adjacent a moving magnetic tape having a servo band including a first servo pattern and a second servo pattern, the system comprising:

a tape drive for moving the magnetic tape across the magnetic tape head in a first direction;

a servo element operably connected to the magnetic tape head for detecting a leading edge and a trailing edge of the first servo pattern, and for further detecting a leading edge and a trailing edge of the second servo pattern, the servo element being located at a predetermined transverse point on the servo band;

a counter operably connected to the servo element for determining a first time from the leading edge of the first servo pattern to the leading edge of the second servo pattern, and for further determining a second time from the trailing edge of the first servo pattern to the trailing edge of the second servo pattern; and a control unit operably connected to the counter for determining a correction value from a difference between the first time and the second time.

9. The system of claim 8 wherein the control unit determines a correction signal in response to the correction value, the correction signal being proportional to the correction value.

10. The system of claim 8 wherein the drive moves the moving magnetic tape across the magnetic tape head in the first direction, further comprising the counter determining a third time between the trailing edge of the first servo pattern and the trailing edge of the second servo pattern, and the control unit adding the correction value to the third time to determine a compensated time.

11. The system of claim 8 wherein the drive moves the moving magnetic tape across the magnetic tape head in a direction opposite the first direction, further comprising the counter determining a third time between a reverse leading edge of the first servo pattern and a reverse leading edge of the second servo pattern, and the control unit adding the correction value to the third time to determine a compensated time.

12. A method for servo pattern compensation comprising:

moving a magnetic tape in a first direction across a magnetic tape head, the magnetic tape having a servo band including a first servo pattern having a leading edge and a trailing edge and a second servo pattern having a leading edge and a trailing edge, the magnetic tape head having a first servo element and a second servo element;

detecting the leading edge of the first servo pattern with the first servo element at a predetermined transverse point on the servo band;

detecting the leading edge of the second servo pattern with the first servo element at the predetermined transverse point;

determining a first time between the detecting the leading edge of the first servo pattern with the first servo element and the detecting the leading edge of the second servo pattern with the first servo element;

detecting the leading edge of the first servo pattern with the second servo element at the predetermined transverse point;

detecting the leading edge of the second servo pattern with the second servo element at the predetermined transverse point;

determining a second time between the detecting the leading edge of the first servo pattern with the second servo element and the detecting the leading edge of the second servo pattern with the second servo element;

determining a first difference between the first time and the second time;

detecting the trailing edge of the first servo pattern with the second servo element at the predetermined transverse point;

detecting the trailing edge of the second servo pattern with the second servo element at the predetermined transverse point;

determining a third time between the detecting the trailing edge of the first servo pattern with the second servo element and the detecting the trailing edge of the second servo pattern with the second servo element;

determining a second difference between the first time and the third time; and determining a correction value from a third difference between the second difference and the first difference.

13. The method of claim 12 further comprising determining a correction signal in response to the correction value, the correction signal being proportional to the correction value.

14. The method of claim 13 further comprising positioning a head module of the magnetic tape head in response to the correction signal.

15. The method of claim 12 further comprising:
moving the magnetic tape in the first direction across the magnetic tape head;
determining a third time between the trailing edge of the first servo pattern and the trailing edge of the second servo pattern; and
determining a compensated time by adding the correction value to the third time.

16. The method of claim 12 further comprising:
moving the magnetic tape in a direction opposite the first direction across the magnetic tape head;
determining a third time between a reverse leading edge of the first servo pattern and a reverse leading edge of the second servo pattern; and
determining a compensated time by adding the correction value to the third time.

17. The method of claim 12 further comprising:
moving the magnetic tape in the first direction across the magnetic tape head;
determining a third time between the leading edge of the first servo pattern and the leading edge of the second servo pattern; and
designating a compensated time as the third time.

18. The method of claim 12 further comprising:
moving the magnetic tape in a direction opposite the first direction across the magnetic tape head;
determining a third time between a reverse trailing edge of the first servo pattern and a reverse trailing edge of the second servo pattern;
designating a compensated time as the third time.

19. A system for positioning a magnetic tape head adjacent a moving magnetic tape having a servo band including a first servo pattern and a second servo pattern, the system comprising:
a tape drive for moving the magnetic tape across the magnetic tape head in a first direction;
a first servo element operably connected to the magnetic tape head for detecting a leading edge of the first servo pattern, and for further detecting a leading edge of the second servo pattern, the servo element being located at a predetermined transverse point on the servo band;
a second servo element operably connected to the magnetic tape head for detecting the leading edge and a trailing edge of the first servo pattern, and for further detecting the leading edge and a trailing edge of the second servo pattern, the servo element being located at the predetermined transverse point;
a counter responsive to the first servo element for determining a first time between the leading edge of the first servo pattern to the leading edge of the second servo pattern, and further responsive to the second servo element for determining a second time from the leading edge of the first servo pattern to the leading edge of the second servo pattern, and further responsive to the second servo element for determining a third time from the trailing edge of the first servo pattern to the trailing edge of the second servo pattern; and
a control unit operably connected to the counter for determining a first difference between the first time and the second time, and for further determining a second difference between the first time and the third time, and for further determining a correction value from a third difference between the second difference and the first difference.

20. The system of claim 19 wherein the control unit determines a correction signal in response to the correction value, the correction signal being proportional to the correction value.

* * * * *